United States Patent [19]

Hauff

[11] 4,234,284
[45] Nov. 18, 1980

[54] UTILITY PLATFORM

[76] Inventor: Joe Hauff, 65 Bonanza Dr., Pasco, Wash. 99301

[21] Appl. No.: 899,537

[22] Filed: Apr. 24, 1978

[51] Int. Cl.$^2$ ............................ B60R 9/00; B60P 1/24
[52] U.S. Cl. .................................... 414/462; 224/282;
224/42.03 R; 224/42.08; 224/42.44; 414/470;
414/537
[58] Field of Search ................... 214/1 SW, 450, 451,
214/452, 453, 454, 505; 224/29 R, 29 L, 42.03
A, 42.03 R, 42.03 B, 42.44, 273, 282, 42.08;
414/11, 462, 463, 464, 468, 470, 466, 469,
474–485, 491, 494, 537

[56] References Cited

U.S. PATENT DOCUMENTS

| 1,725,329 | 8/1929 | Blandford | 414/11 |
| 3,467,261 | 9/1969 | Jewell | 214/1 SW |
| 3,720,333 | 3/1973 | Vaughn . | |
| 3,724,694 | 4/1973 | Wilson | 214/450 |
| 3,796,333 | 3/1974 | Goldstein . | |
| 3,805,984 | 4/1974 | Schwarz et al. . | |
| 3,912,098 | 10/1975 | Nicotra | 224/42.03 A |
| 3,913,811 | 10/1975 | Spencer . | |
| 3,921,842 | 11/1975 | Campbell | 214/505 X |

*Primary Examiner*—Frank E. Werner
*Attorney, Agent, or Firm*—Wells, St. John & Roberts

[57] ABSTRACT

A utility platform is described that is attachable to the standard tubular hitch connector of a vehicle. The platform includes a central support beam that is mounted at one end to the tubular hitch connector. The support beam mounts a support panel for pivotal movement about a horizontal axis. A detent assembly interconnects the support beam and panel. It automatically operates to lock the panel in a horizontal carrying position. It is manually operable to unlock the panel and allow it to pivot to a tilted loading position. The panel is centered over the support beam and is substantially balanced thereon when in the horizontal carrying position.

4 Claims, 5 Drawing Figures

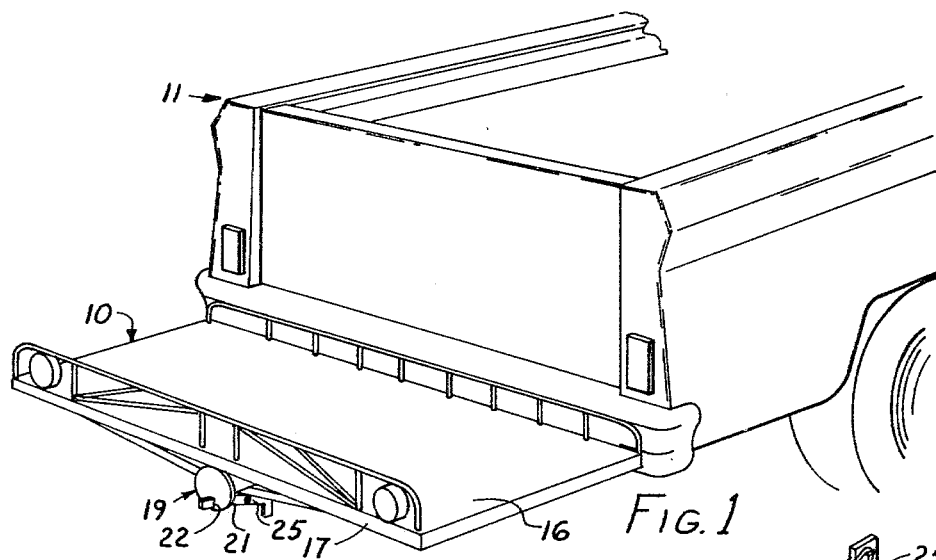
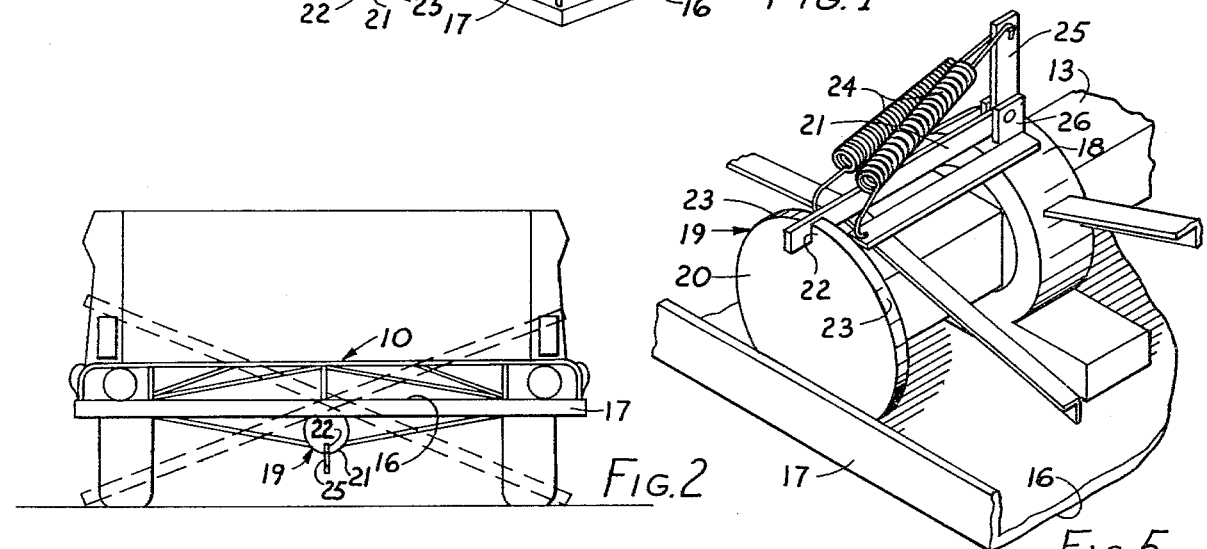
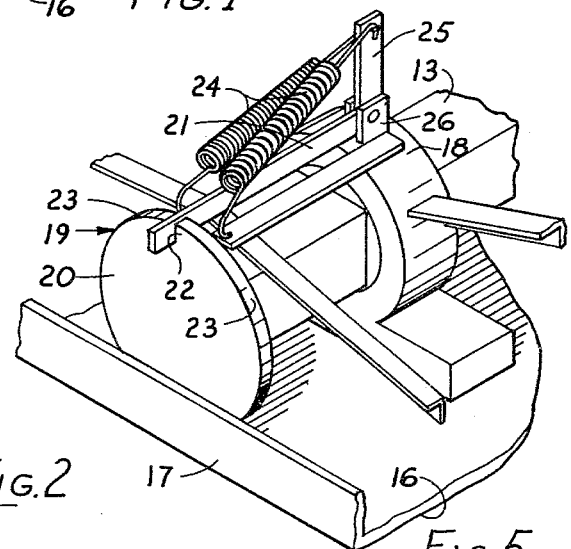
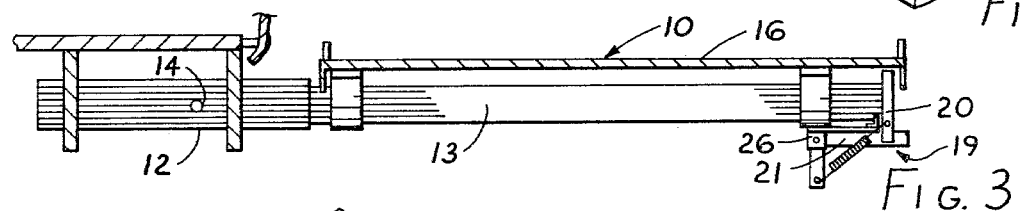
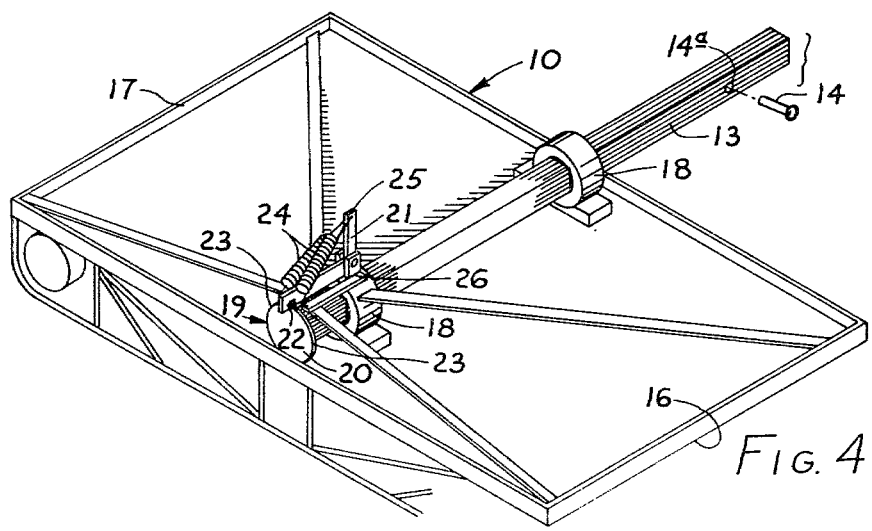

4,234,284

UTILITY PLATFORM

BACKGROUND OF THE INVENTION

The present invention relates to load carriers that are attachable to vehicles and more particularly to such type carriers that are selectively movable between loading and carrying positions.

Various forms of apparatus are presently being utilized for the purpose of carrying loads along side an associated vehicle. Such carriers are typically mounted to the vehicle frame or bumper. Other carrying frames are mounted to conventonal forms of trailer hitches and bumper mounts and are pivotable between loading and unloading positions. Such a platform may be pivoted or tilted to one side with an end close to or engaging the ground surface. A load may then be rolled onto a platform which is then tipped to a carrying position. The difficulty with these platforms is in the locking mechanisms for holding the load in a horizontal carrying position. They are usually manually operable and are very difficult for one person to operate while maintaining the platform and usually heavy load in a horizontal position. It therefore becomes desirable to obtain some form of utility platform that is mountable to a vehicle that will operate automatically to lock its support surface in a horizontal carrying position without manual intervention by the operator.

BRIEF DESCRIPTION OF THE DRAWINGS

FIG. 1 is a pictorial view illustrating a portion of a vehicle with the present platform mounted thereto;

FIG. 2 is an end elevational view of the present platform illustrating different loading positions by dashed lines;

FIG. 3 is an enlarged fragmentary sectional view taken substantially along line 3—3 in FIG. 2;

FIG. 4 is a fragmentary pictorial view illustrating the bottom of the present platform; and FIG. 5 is an enlarged fragmentary detail view of a portion of the present platform.

DETAILED DESCRIPTION OF A PREFERRED EMBODIMENT

The utility platform of the present invention is generally illustrated in the accompanying drawings and is designated therein by the reference character 10. The platform 10 is designed to be mounted to a vehicle such as that partially shown at 11. It is preferred that the platform be mounted to a standard form of tubular trailer hitch connector 12 (FIG. 3) that is affixed by conventional means to the vehicle frame of bumper assembly. Typically, the tubular trailer hitch connector 12 is of standard size rectangular channel that is open at both ends and extends longitudinally rearwardly from the transverse center of the vehicle.

The present utility platform 10 includes a central support beam 13 having an end received within the length of tubular trailer hitch 12. It is also rectangular in cross section so as to be complementary to the crosssectional interior of the hitch 12. The support beam 13 will therefore protrude horizontally and be held stationary against rotational movement about a longitudinal central axis. A lock pin 14 and appropriate aligned apertures 14a are provided as means for connecting the support beam 13 and tubular trailer hitch 12 to prevent relative longitudinal movement. They also facilitate quick mounting and dismounting of the entire platform unit 10 from the vehicle 11.

A rectangular support panel 16 is pivotably mounted to the central support beam 13. It includes a rectangular frame 17 and is mounted by two longitudinally spaced sleeves or bearings 18 to the beam 13. The bearings 18 define the central horizontal axis that the panel 16 and frame 17 pivot about. The panel 16 is centered on the support beam and its weight is evenly divided on opposite sides of the horizontal axis. The panel will thus be evenly balanced on the support beam when located in a horizontal position.

The bearings 18 enable pivotal movement of the support panel 16 between one of two loading positions (FIG. 2 dashed lines) and a horizontal carrying position (FIGS. 1 and 2, solid lines). The panel 16 is tilted to one side of the support beam 13 at either loading position with an end engaging the ground surface. The two loading positions are illustrated in FIG. 2 by dashed lines. A detent assembly 19 is provided to secure the support panel 16 automatically in the horizontal position as it is pivoted from one of the loading positions. The detent assembly 19 is illustrated in substantial detail in FIGS. 3 through 5.

Detent assembly 19 includes a circular plate 20 that may be affixed to the outer end of stationary support beam 13. Therefore, the plate 20 will not rotate about the pivot axis but will remain stationary along with the support beam 13. A locking lever 21 is pivotably mounted to the frame 17 by a bracket 26 on one of the bearings 18. It is releasably received within a locking indentation 22 of the plate 20. Arcuate surfaces 23 are formed on a radius from the horizontal axis and extend to either side of the locking indentation 22. The surfaces 23 slidably engage locking lever 21 as the support panel 16 is pivoted to and from the loading position. However, when the panel reaches the horizontal carrying position, the locking lever 21 will snap automatically into the locking indentation 22 to prevent further pivotal movement of the panel about its central pivot axis.

The locking lever 21 is biased continuously against the plate 20 by means of biasing springs 24 that are connected between an upright leg 25 of the locking lever 21 and the bracket 26. The arrangement of the upright leg 25 and pivot for the locking lever 21 insure that forceable engagement by debris will not accidently trip the locking lever 21 and allow the support panel 16 to move to its unloading position. Instead, if the leg is struck by an object encountered along a roadway, the resulting force is transmitted through the locking lever to urge it with greater force into the locking indentation 22.

Prior to operation, the platform 10 is mounted to the vehicle 11 simply by inserting the support beam 13 within the tubular trailer hitch connector 12. Apertures 14a may be aligned and the lock pin 14 inserted to secure the platform in place. Once this is done, the platform is ready to be loaded. If the platform has previously been locked in the horizontal carrying position, the user must manually move the locking lever 21 downwardly until it becomes disengaged with the locking indentation 22. The support panel 16 is then free to pivot to either side of the side of the pivot axis and the locking lever 21 may be released to slide along the arcuate surfaces 23.

The load may be moved onto the inclined panel 16 at the loading position. It is particularly advantageous to use the present platform for loading and unloading wheeled vehicles such as motorcycles, motorbikes, snowmobiles, etc. However, it is also entirely feasible to use the present platform for hauling, loading and unloading many other forms of apparatus and material.

The central location of the horizontal pivot axis for the support panel 16 enables a single operator to pivot the loaded support panel upwardly to the horizontal carrying position with relative ease. This is so especially if the load has been evenly distributed across the support panel. The support beam acts as a fulcrum, with the loads on opposite sides of the horizontal axis working against each other. If the load is reasonably distributed, the weight differential on opposite sides of the fulcrum will be minimal. The panel may thus be easily pivoted back up to the horizontal carrying position regardless of the total weight bearing on the support beam.

I have estimated the carrying capacity of the platform at 500 lbs. but that figure may vary with the vehicle utilized and the construction materials of the platform. However, a maximum load, if evenly distributed over the horizontal pivot axis, can be relatively easily handled by one person since there is no need to keep one hand free to operate the detent mechanism. As the operator moves the loaded support panel 16 about the axis toward the horizontal position, the locking lever 21 will slide over the arcuate surfaces 23 toward the locking indentation 22. The locking lever 21 is snapped immediately into the locking indentation 22 through forceable operation of the springs 24 when the horizontal carrying position is reached. This securely locks the support panel 16 in its horizontal carrying position and will not allow further pivotal movement until selective downward force is applied to the locking lever by the operator. Both of the operators arms are thereby free to steady the load as the panel is pivoted between the two positions.

The above description was given by way of example to disclose a preferred form of the present invention and is not intended to restrict the scope of the invention. Such restrictions are made only by the following claims.

What I claim is:

1. A utility platform mountable to a vehicle, comprising:
   a central support beam adapted to be mounted to the vehicle in a stationary and horizontal position thereon;
   a support panel;
   bearing means mounting the support panel to the central support beam for free pivotal movement of the support panel about a horizontal axis between a loading position wherein the support panel is tipped to one side of the horizontal axis and a carrying position wherein the support panel is horizontal;
   the support beam and bearing means being centered across the support panel so that the support panel is balanced thereon when at its carrying position; and
   manually releasable detent means interconnecting the support beam and support panel for allowing pivotal movement of the support panel about said horizontal axis to its loading position and automatically operable for locking the support panel in its horizontal carrying position as the support panel is pivoted about said horizontal axis to a horizontal position;
   the detent means comprising:
   a locking lever mounted to the support panel for pivotal movement therewith about the horizontal axis;
   a plate mounted to the central support beam having an arcuate surface formed about the horizontal axis for slidably engaging the locking lever;
   an indentation positioned along the arcuate surface of the plate to receive and releasably lock the locking lever and support panel against pivotal movement about the horizontal axis when the support panel is at its carrying position; and
   biasing means operatively connected between the support panel and locking lever for continuously urging the locking lever inwardly toward the arcuate surface of the plate.

2. A utility platform as defined by claim 1 mountable to a vehicle having a tubular trailer hitch connector of rectangular cross section;
   wherein the support beam is a channel of rectangular cross section complementary to the cross-sectional configuration of the tubular hitch connector and is receivable within the tubular trailer hitch connector.

3. The utility platform as defined by claim 2 further comprising means for selectively securing the tubular trailer hitch connector and the horizontal support beam against relative longitudinal sliding movements.

4. The utility platform as defined by claim 1 wherein the arcuate surface of the plate is formed on a radius from the horizontal axis.

* * * * *